United States Patent [19]

Tholen

[11] 4,273,082
[45] Jun. 16, 1981

[54] COOLING SYSTEM FOR VEHICLE DRIVE

[75] Inventor: Paul Tholen, Bergisch Gladbach, Fed. Rep. of Germany

[73] Assignee: Klöckner-Humboldt-Deutz Aktiengesellschaft, Cologne, Fed. Rep. of Germany

[21] Appl. No.: 941,865

[22] Filed: Sep. 13, 1978

[30] Foreign Application Priority Data

Sep. 14, 1977 [DE] Fed. Rep. of Germany ....... 2741244

[51] Int. Cl.³ .............................. F01P 1/06; F01P 3/12
[52] U.S. Cl. ............................... 123/41.31; 123/41.48; 123/41.62; 123/563; 123/41.33; 60/599
[58] Field of Search ............... 123/41.31, 41.33, 41.48, 123/41.51, 41.56, 41.62, 119 CD, 563; 60/599; 188/264 F

[56] References Cited

U.S. PATENT DOCUMENTS

| 3,134,371 | 5/1964 | Crooks | 123/41.31 |
| 3,162,998 | 12/1964 | Williams | 123/41.33 |
| 3,218,106 | 11/1965 | Junck et al. | 188/264 F |
| 3,229,456 | 1/1966 | Gratzmuller | 123/41.31 |
| 4,049,047 | 9/1977 | Keen | 123/41.31 |
| 4,059,080 | 11/1977 | Rudert | 60/599 |

Primary Examiner—Charles J. Myhre
Assistant Examiner—W. Wolfe
Attorney, Agent, or Firm—Becker & Becker, Inc.

[57] ABSTRACT

A cooling system for an air cooled vehicle drive having a supercharged internal combustion engine, a transmission, a hydrodynamic brake (retarder), and a plurality of heat exchangers. The media which are to be cooled are at least partially in mutual heat exchange. Cooling oil or fluid ducts for the retarder or transmission oil and/or lubricating oil of the internal combustion engine pass entirely or at least partially through a supercharger intercooler or charging air cooler. The retarder or lubricating oil is cooled in a heat exchanger which is acted upon by cooling air.

3 Claims, 12 Drawing Figures

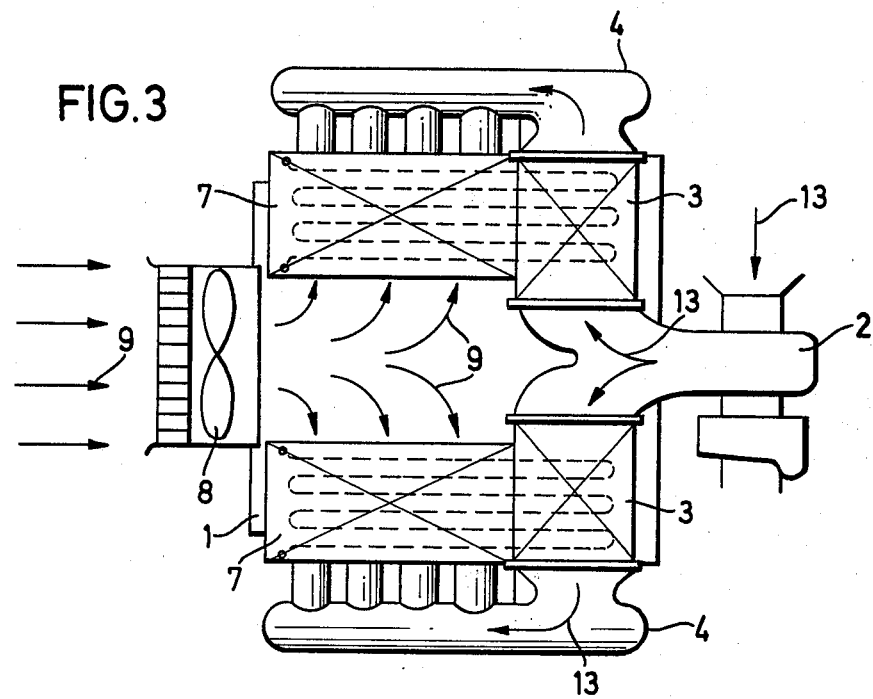
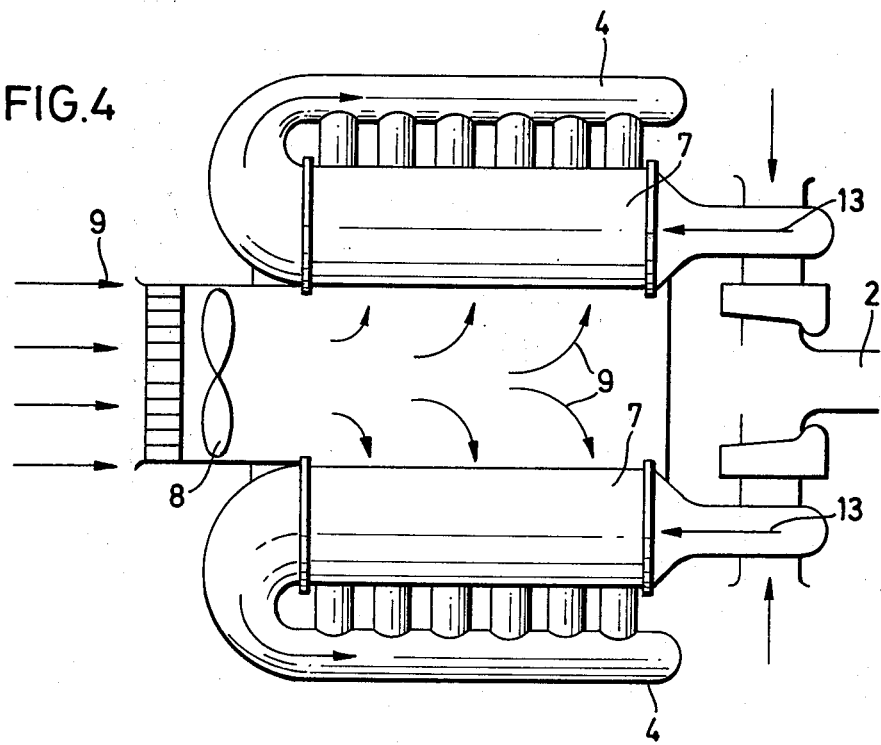

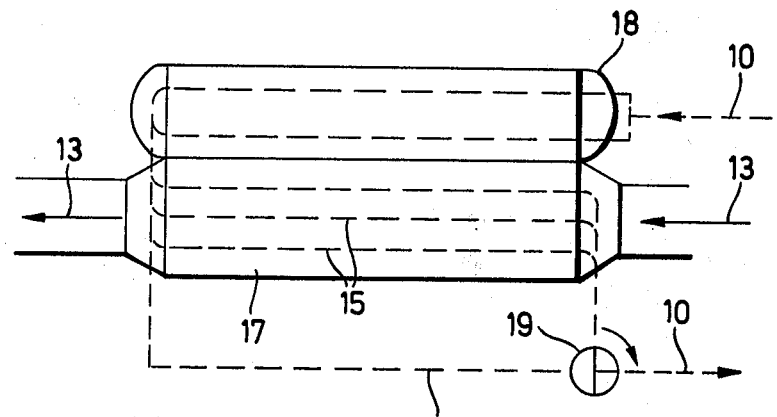
FIG.8
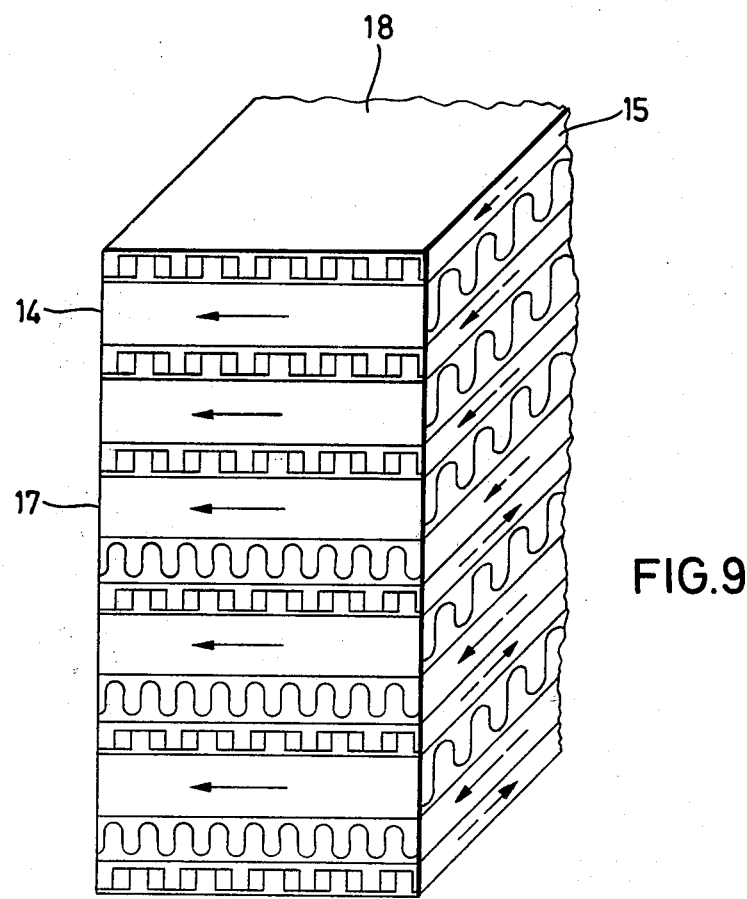
FIG.9

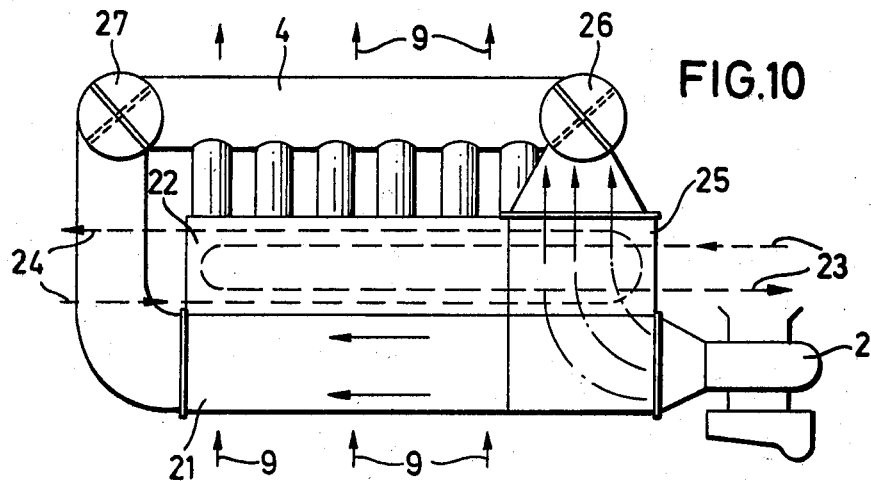
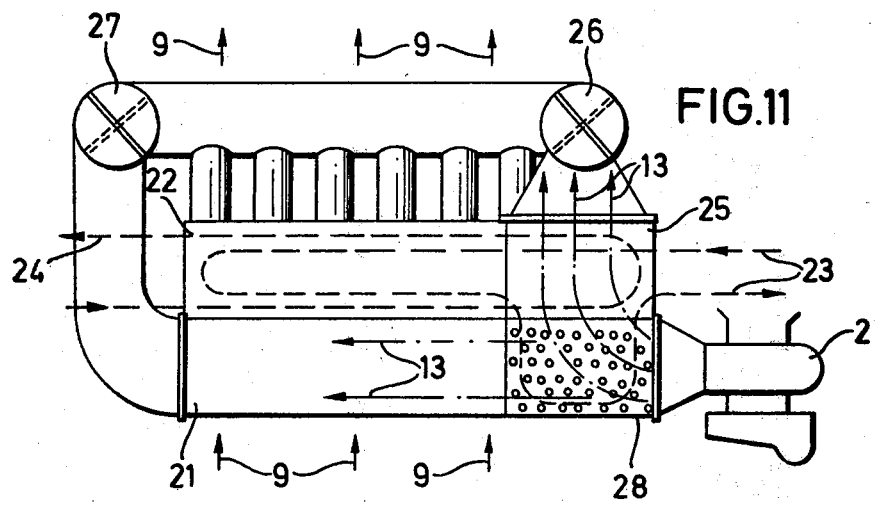
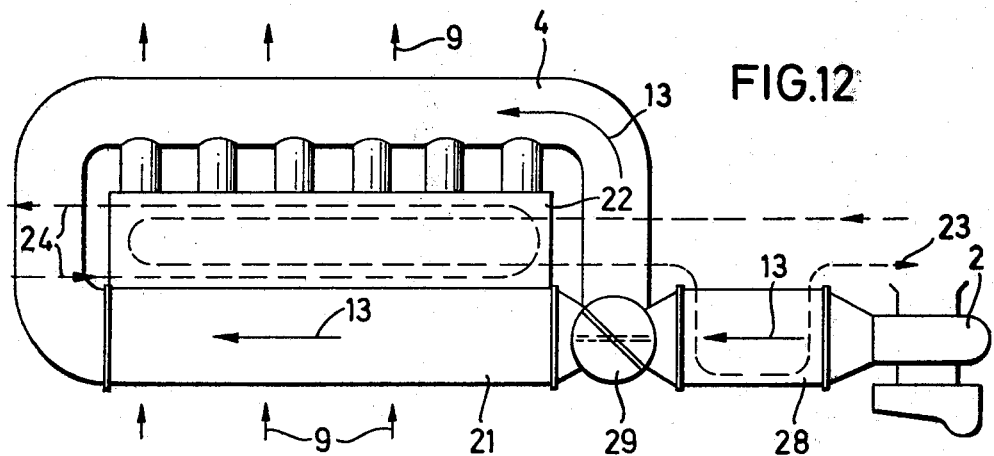

COOLING SYSTEM FOR VEHICLE DRIVE

The present invention relates to a cooling system for an air cooled vehicle drive having a supercharged internal combustion engine, a transmission, a hydrodynamic brake (retarder), and a plurality of heat exchangers. The media which are to be cooled are at least partially in opposite or reciprocal heat exchange.

When driving heavy vehicles with supercharged internal combustion engines, the customary motor brake (exhaust brake) no longer suffices in many instances. Therefore, in order to reinforce the braking power, retarders are being used in increasing numbers. The operating fluid of the retarders, in conformity with the braking power, must be cooled in a heat exchanger. In addition, during high power operations of vehicles, suitable heat exchangers are used to recool the charging air, the lubricating oil, and the transmission oil.

A cooling system of the above described type is already known. According to this system, the retarder oil and the lubricating oil of the internal combustion engine are recooled in a three-stream cooler. In this connection, the oils are in direct heat exchange contact not only with one another, but also with the cooling air. In so doing, the different heat yields in the lubricating oil and in the retarder oil must be taken into account, so that during the braking operation the lubricating oil is utilized to cool the retarder oil and is simultaneously maintained at a favorable operating temperature.

The arrangement of the various heat exchangers relative to one another causes difficulties with air-cooled vehicle drives since, in comparison to cooling water conduits, the cooling air ducts and conduits have large cross sections and can therefore not be installed with the same freedom of placement in the frequently cramped space which is available therefor.

It is, therefore, an object of the present invention to provide a cooling system for vehicle drives according to which the heat exchangers can be kept small at the same cooling efficiency, and the arrangement of the heat exchangers on air-cooled internal combustion engines is possible in a space-saving manner.

This object and other objects and advantages of the present invention will appear more clearly from the following specification in connection with the accompanying drawings, in which:

FIG. 1 diagrammatically illustrates a reciprocable piston internal combustion engine with a cooling system according to the present invention;

FIG. 3 shows a cooling system according to the invention for a V-engine;

FIG. 4 shows a cooling system similar to that of FIG. 3 but differing therefrom in that the heat exchangers or recoolers are arranged over the charging air coolers so as to completely cover them and have the same contour, while forming a structural unit therewith;

FIGS. 8 and 9 show a structural unit according to the invention arranged above an oil cooler;

FIG. 10 illustrates a cooling system according to the invention, according to which a charging air cooler is, when viewed in the direction of flow of the cooling air, followed by an air cooler having cooling passages for the retarder oil and cooling passages for the lubricating oil of the internal combustion engine;

FIG. 11 shows a cooling system similar to that of FIG. 10 but differing therefrom in that the precooler precedes the charging air cooler; and FIG. 12 illustrates a cooling system according to the invention which differs from that of FIG. 11 in that a switch-off valve is provided between the precooler and the charging air cooler.

Figure 1:
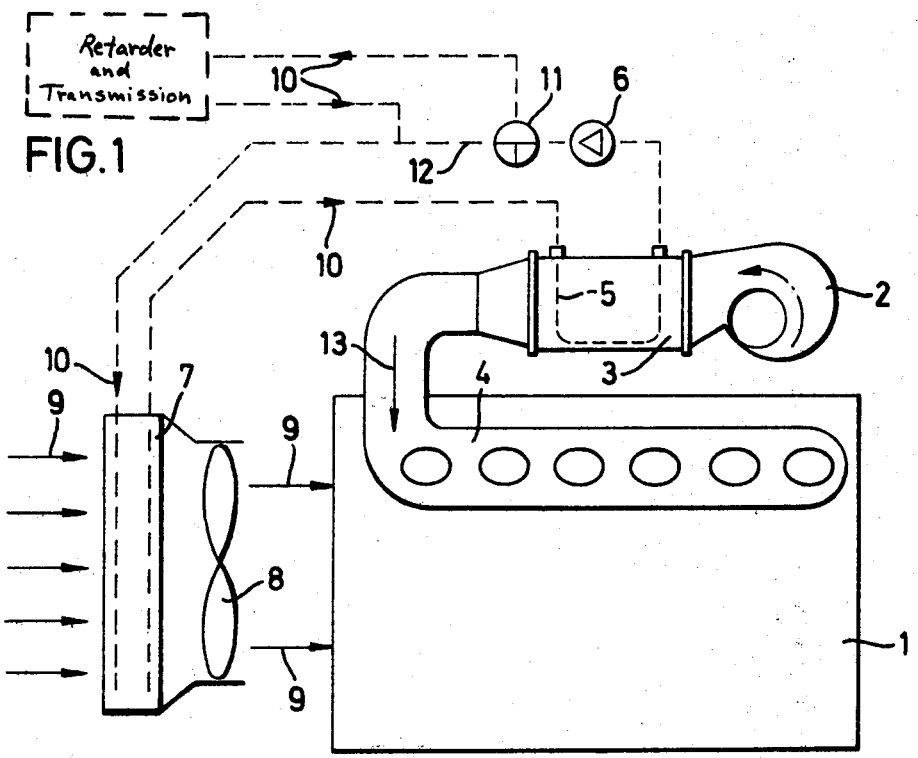

The cooling system of the present invention is characterized primarily in that cooling oil or fluid ducts for the retarder or transmission oil and/or lubricating oil of the internal combustion engine pass entirely or at least partially through a supercharger intercooler or charging air cooler. In this connection, the retarder or lubricating oil are cooled in a heat exchanger which is acted upon by cooling air.

With the cooling system of the present invention, the thermal yield is already favorably equalized with the media undergoing cooling. Thus, during the charging operation, the charging air and the lubricating oil are cooled by means of the transmission or retarder oil, while in the braking operation, the charging air and the lubricating oil cool the retarder oil and are in so doing themselves simultaneously advantageously heated up, as a result of which an extended cooling of the internal combustion engine is prevented during a long, downhill drive. The overall volume of the supercharger intercooler is only slightly increased by the oil ducts. Furthermore, with the cooling system of the present invention, the possibility exists that the supercharger intercooler itself is not affected by the cooling air, but is rather merely cooled by the transmission/retarder oil. In this case, the supercharger intercoolers can be optimally arranged with regard to the charging air conduit, while the retarder/transmission cooler maintains its favorable position with regard to the cooling air stream. The necessary connecting lines for the retarder/transmission oil are easy to accommodate due to their relatively small conduit cross section. The connecting lines can be eliminated if, pursuant to one embodiment of the present invention, the supercharger intercooler forms a unit with a heat exchanger for the retarder/transmission oil or lubricating oil. With this arrangement, pursuant to a further embodiment of the present invention, the unit is designed as a multi-stream heat exchanger, according to which the ducts for the cooling media have common separating walls not only with regard to one another but also with regard to the ducts for the cooling air. In this way, the cooling media are in heat exchange not only with one another but also with the cooling air, so that, with a small cooling air requirement, optimum operating conditions exist not only during the charging operation but also during the braking operation.

However, with the reciprocal heat exchange it is not possible without further measures to cool the charging air, during operation of the internal combustion engine, below the temperature of the retarder or transmission oil. Therefore, pursuant to a further embodiment of the present invention, it is proposed that the ducts which are intended for the retarder or transmission oil and which pass through the supercharger intercooler, be capable of being shut off by means of a bypass line and a bypass valve during the pulling operation of the vehicle. During this time, the retarder or transmission oil, in conformity with the low terminal yield, is recooled in a small separate heat exchanger. One advantageous possible approach exists if, pursuant to a further embodiment of the present invention, the supercharger intercooler comprises a main cooler and a precooler, according to which the retarder or lubricating oil ducts only pass through the precooler, while a further oil cooler is arranged behind the main cooler in the direction of the cooling air, and the main cooler, on the side of the charging air, can be avoided by means of a controllable bypass. In case the precooler and main cooler form a unit, this can be realized by arranging shut-off valves in the flow path of the charging air behind the main cooler and at the start of the bypass line. The main cooler is avoided on the side of the charging air during the braking operation, so that the entire cooling capacity of the cooling air is completely used in the retarder or transmission oil coolers. In addition, the heated-up charging air prevents an extensive cooling of the internal combustion engine during the braking operation.

When the internal combustion engine is started, it may also be expedient to bypass the main cooler for the charging air until the internal combustion engine has reached its operating temperature.

Pursuant to a further embodiment of the present invention, it is proposed that the controlled charging air acts upon a portion of the oil cooler parallel to the cooling air. In this case, the cooling capacity of the charging air is used to cool the retarder oil during the braking operation.

The control valves, switching valves, or shut-off valves can, for example, be connected mechanically or by means of a magnetic valve during actuation of the retarder. However, pursuant to an embodiment of the present invention, it is expedient that the valve be automatically actuated as a function of the retarder oil temperature, for example by means of a bimetallic or wax thermostat. Such a control is easy to realize since the oil temperature during retarder operation can be considerably higher than during charging operation of the internal combustion engine, thus making possible a stable and reliable control.

It is proposed pursuant to a further embodiment of the present invention that the switching valve be controlled as a function of the oil pressure in the retarder. This control is also particularly simple, since the oil pressures in the retarder increase sharply during the braking operation.

Referring now to the drawing in detail, an exhaust-drive or turbo supercharger 2 conveys the air for combustion through a charging air cooler or supercharger intercooler 3 into an intake manifold 4 of the reciprocating piston internal combustion engine 1. The supercharger intercooler 3 is also provided with cooling oil ducts 5, the cooling oil of which serves to cool a retarder which is not shown. The cooling oil is circulated by a circulating pump 6 and is recooled in a heat exchanger 7. The heat exchanger 7 is arranged in front of a fan 8 which conveys cooling air for the internal combustion engine in the direction of the arrows 9. The charged air passes through the supercharger intercooler 3 in the direction of the arrow 13.

The arrows 10 indicate the flow direction of the cooling oil. A switching or change-over valve 11, in combination with a bypass line 12, provides that in the charging operation of the internal combustion engine, the cooling oil only flows through the supercharger intercooler 3 and the heat exchanger 7, while in the braking operation, the cooling oil also flows through the retarder. Such a cooling system is advantageous if the cooling oil additionally only flows through the retarder. However, such a cooling system is also sufficient if the retarder oil is additionally used as transmission oil and only small amounts of heat are to be withdrawn in the transmission.

Figure 2:
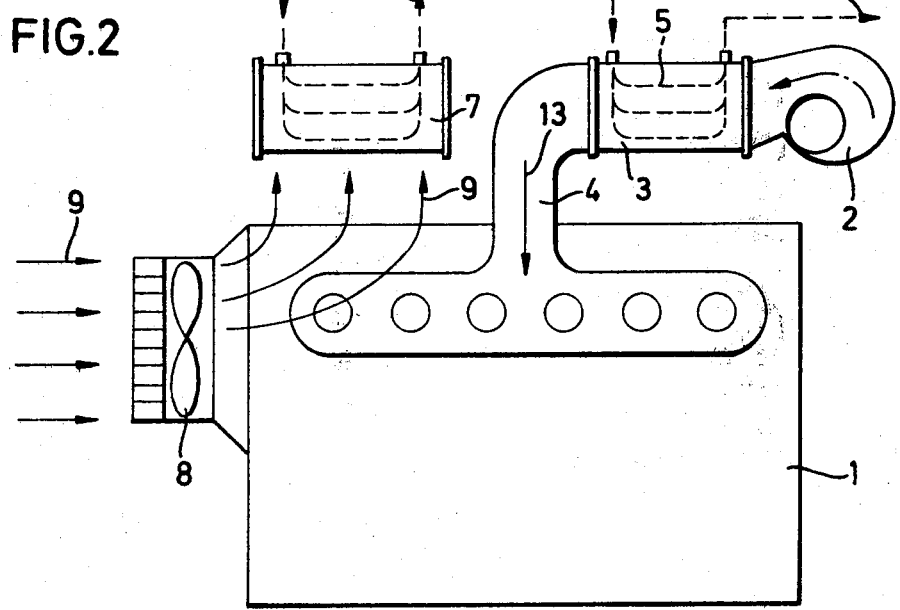
FIG. 2 is a diagrammatic illustration of a cooling system similar to that of FIG. 1 but differing therefrom in that the heat exchanger or recooling device is located behind the fan in a secondary air stream.

FIG. 2 shows a similar cooling system. Therefore, parts which operate the same are designated with the same reference numerals. The difference between the system of FIG. 1 and that of FIG. 2 consists in that the heat exchanger 7 is arranged behind the fan 8 in a secondary air stream. This arrangement is more suitable if in the charging operation of the internal combustion engine 1, the cooling oil must take up a significant quantity of heat from the transmission (not shown), because in this way the cooling of the internal combustion engine is not affected.

FIG. 3 shows an internal combustion engine 1 which is designed as a V-engine. The cooling air is conveyed by a fan 8 in the direction of the arrows 9 between the rows of cylinders and, in a secondary stream, flows through the heat exchangers 7 which are arranged above the cylinders and partially extend into the space between the rows of cylinders. The supercharger intercoolers 3 are arranged next to the heat exchangers 7 in the direction of the rows of cylinders and form a compact unit with the heat exchangers 7. By avoiding connecting lines, a particularly space saving arrangement is thus achieved.

FIG. 4 shows a cooling system similar to that of FIG. 3. However, in the system of FIG. 4, the heat exchangers 7 are arranged over the supercharger intercoolers 3, covering them and having the same contour, and forming a unit therewith.

Figure 5:
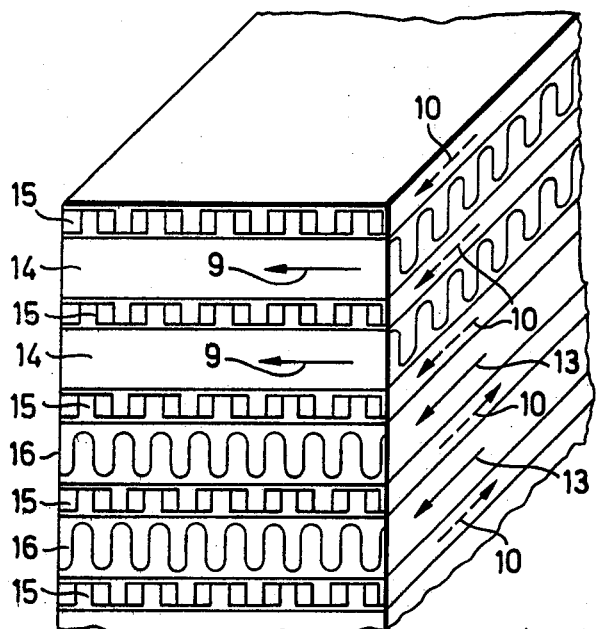
FIG. 5 is a fragmentary cross section of the cooling unit of FIG. 4.

FIG. 5 diagrammatically illustrates the construction of part of the cooling unit of FIG. 4. The reference numeral 14 designates the ducts for the cooling air, 15 the ducts for the oil, and 16 the ducts for the charging air.

Figure 6:
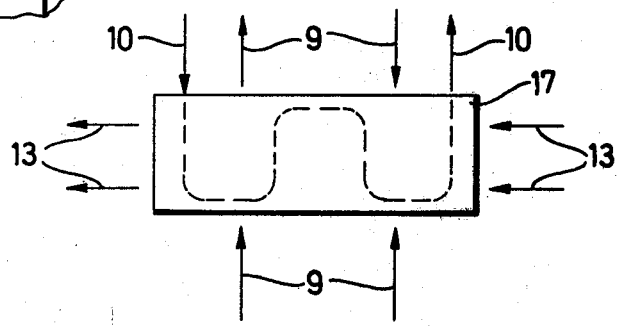
FIGS. 6 and 7 illustrate a further favorable shape of the charging air and oil cooler as a structural unit.
Figure 7:
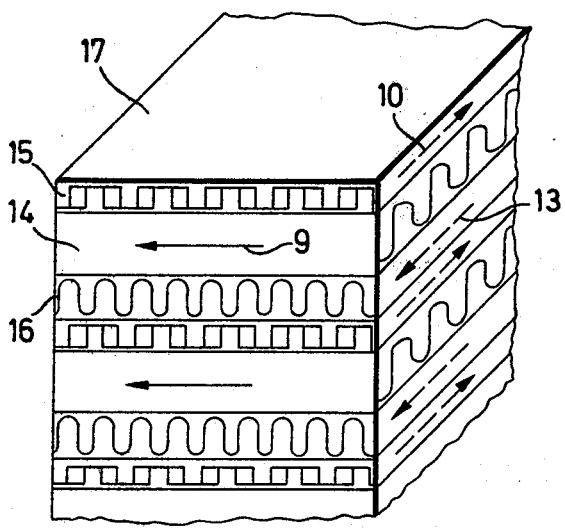

FIGS. 6 and 7 illustrate a further advantageous embodiment of the charging air and oil coolers as a unit 17. In alternating succession, the unit 17 comprises ducts 15 for the cooling oil, ducts 14 for the cooling air, and ducts 16 for the charging air. In contrast to a customary air-cooled supercharger intercooler having the same efficiency, the unit 17 must be about 25% higher. However, in comparison to separate charging air and oil coolers, the overall volume is decreased considerably.

With the cooling systems of FIGS. 2–7, the coolest temperature of the charging air is limited by the temperature of the transmission oil in the charging operation. FIGS. 8–12 show embodiments with which this is not the case.

FIGS. 8 and 9 show a unit 17 over which is arranged an oil cooler 18. The oil cooler 18 is connected in series with the cooling oil ducts 15 in the unit 17. By means of a switching or change-over valve 19 and a bypass line 20, the cooling oil ducts 15 can be avoided, so that in the charging operation of the internal combustion engine 1, only the charging air and the cooling air flow through the unit 17. The lowest achievable charging air temperature is thus not affected by the temperature of the cooling oil.

In the embodiment shown in FIG. 10, an oil cooler 22 follows a charging air cooler 21 in the direction of flow of the cooling air. The oil cooler 22 comprises not only cooling ducts 23 for the retarder oil, but also cooling ducts 24 for the lubricating oil of the internal combustion engine. A portion 25 of the oil cooler 22 is designed as a bypass and is controlled by a shutoff device 26. In addition, a shut-off device 27 is arranged behind the charging air cooler 21. The shut-off devices 26 and 27 are operated in such a way that during the charging operation, charging air flows through the charging air cooler 21, while during the braking operation or when the internal combustion engine is cold, the charging air is conducted through the bypass 25. In this connection, a cooling of the retarder oil takes place during simultaneous heating of the charging air, as a result of which favorable operating conditions are achieved for the internal combustion engine.

The embodiment of FIG. 11 is similar to that of FIG. 10, but a precooler 28 precedes the charging air cooler 21. Cooling ducts 23 for the retarder oil pass through the precooler 28. In this way, in as small a space as possible, an effective heat transfer can be achieved between the charging air and the retarder oil. The embodiment of FIG. 12 differs from that of FIG. 11 in that a switch-off valve 29 is provided between the precooler 28 and the charging air cooler or supercharger intercooler 21. In this way, the shut-off devices 26 and 27 of the embodiment of FIG. 11 are eliminated.

The present invention is, of course, in no way restricted to the specific showing of the drawings, but also encompasses any modifications within the scope of the appended claims.

What I claim is:

1. A cooling system for an air cooled vehicle drive, which comprises:
    an internal combustion engine;
    a transmission operatively connected to said engine;
    a retarder operatively connected to said engine;
    a supercharger intercooler system operatively connected to said engine;
    ducts for conducting oil to and from said internal combustion engine, said transmission, and said retarder, some of said ducts passing at least partially through said supercharger intercooler system; and
    at least one air cooled heat exchanger for cooling oil for said retarder and said transmission, said supercharger intercooler system comprising a main cooler and a precooler, said oil ducts for said transmission and said retarder passing through said precooler, an additional oil cooler which follows said main cooler in the direction of flow of cooling air, and a controllable bypass which precedes said main cooler in the direction of flow of charging air.

2. A cooling system according to claim 1, which includes a structural unit comprised of said main cooler and said precooler, and shutoff devices respectively provided in said bypass and following said main cooler in the direction of flow of charging air.

3. A cooling system according to claim 2, in which said bypass is arranged in such a way that charging air switchable through said bypass is oriented to act upon a portion of said additional oil cooler parallel to cooling air.

* * * * *